INVENTOR.
THEODORE L. MATTHEWS
BY
EDWARD D. O'BRIAN
ATTORNEY

INVENTOR.
THEODORE L. MATTHEWS
BY
EDWARD D. O'BRIAN
ATTORNEY

United States Patent Office 3,430,421
Patented Mar. 4, 1969

3,430,421
COMBINED MOWER AND VACUUM DEVICE
Theodore L. Matthews, 6131 Ludlow Ave.,
Garden Grove, Calif. 92641
Filed Jan. 3, 1967, Ser. No. 606,700
U.S. Cl. 56—23        8 Claims
Int. Cl. A01d 43/00, 35/22, 53/06

ABSTRACT OF THE DISCLOSURE

This invention is directed to a combined mower and vacuum device, particularly arranged for the proper mowing and cleaning up of grass and other vegetation grown on lawns and in similar areas. The mower part of the combination comprises a pair of mutually reciprocating cutting bars which carry cooperating blades. The direction of reciprocation is generally transverse to the direction of movement of the combined device. Blades are mounted on and extend forward from the cutter bars so that reciprocation of the cutter bars causes shearing action between the blades. In order to maintain shearing action, the cutter bars and blades attached thereto are stressed in an appropriate direction to cause interengagement of the blades to result in good shear area contact and self-sharpening of the blade edges. The vacuum device is primarily designed to apply vacuum to the zone directly above the cutter bars so as to remove the cut grass. However, the positioning of the vacuum device so that vacuum is applied above the cutter bars produces an unexpected result which comprises the holding of the vegetation in an upright position so that it is properly positioned and restrained to be cut. Thus, the vacuum device both retains the grass in a position to be cut and removes the cut grass.

Background

Sickle bar mowers are well known, but their cutting characteristics in the past have made them more suitable for the cutting of vegetative materials which are relatively tall, as compared to ordinary lawn grass. This circumstance arises from the fact that past sickle bar mowers have not had as good cutting action as reel type mowers. Thus, reel type mowers have been preferred for short lawn grasses because of their better cutting characteristics. However, the improved blade construction and cutting action of the present mower permits it to cut precisely and thus to be useable on lawn grass. This brings the advantages of the sickel bar type of mower to lawn grass cutting. These advantages comprise having a relatively small mower which cuts at its front edge so that the lawn grass may be mowed directly up to obstructions. Furthermore, while lawn vacuums are also known, the placement of a lawn vacuum in such a position as to hold up the grass during the time it is cut improves the cutting actions result in a more smothly cut lawn, and this is the unexpected result of the present combination. Such is completely absent from the prior art.

Description

Accordingly, it is an object of this invention to provide a combined mower and vacuum device wherein the vacuum device positions the vegetation for cutting at the point of the cutting action of the mower to thus cause the mower to have positioned vegetation to act upon to accomplish a smooth, even cut. It is another object of this invention to provide a sickle bar mower in which the relatively reciprocating sickle bars, each carrying cutter blades, are positioned and stressed in such direction as to cause proper shearing action between the blades and to cause self-sharpening of the blades to maintain accurate and sharply cutting shear edges. It is still another object of this invention to provide a cooperative mower and vacuum device which acts as a unit to accurately cut and promptly remove lawn vegetation. It is a further object of this invention to provide a combined mower and vacuum device wherein the mower may be swung out of action so that the device may be used as a vacuum device alone for the picking up of leaves and other debris upon a lawn without cutting the lawn. It is still another object of this invention to provide a combined mower and vacuum device which is economic of construction yet of a long and maintenance-free life so that the combined device may be widely used. Other objects and advantages of this invention may become apparent from a study of the following portion of this specification, the claims and the attached drawings.

Figure 1:
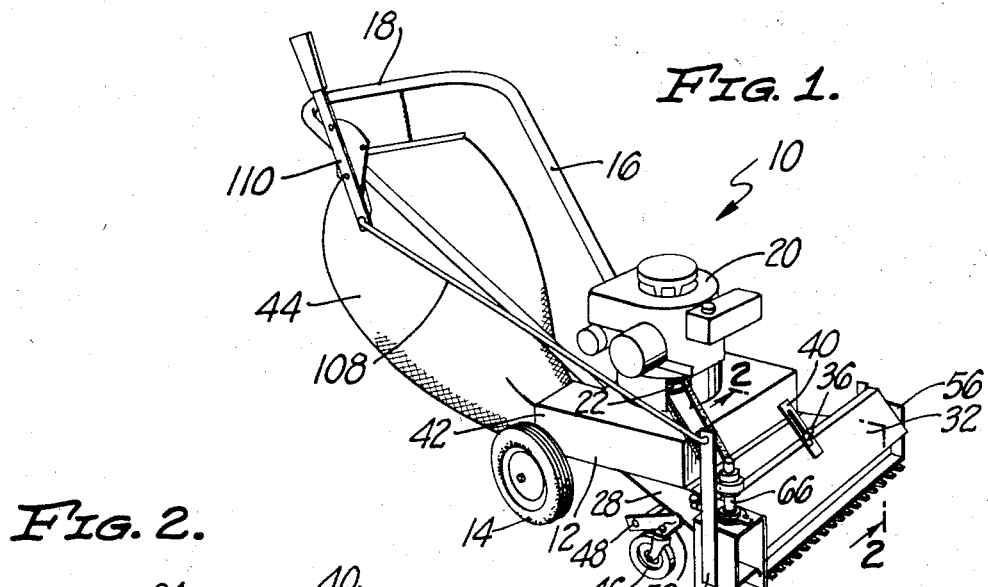
FIG. 1 is an isometric view of the combined mower and vacuum device of this invention.

Referring now to the drawings in more detail, the combined mower and vacuum device of this invention is generally shown at 10. The combined mower and vacuum device 10 has a frame 12 to which are rotatably fixed a pair of wheels, one of which is shown at 14. These wheels provide the primary support of the frame and the equipment affixed thereto. Frame 12 carries handle 16 which has handle bar 18, positioned so as to be at a comfortable height for a person operating the device 10. Motive means 20 is a motor having a vertically extending shaft. Motive means 20 may be any conventional motive means, such as a gasoline engine or an electric motor. A gasoline engine is shown, and is preferred because of its independence from another power supply. The upright shaft of motive means 20 carries mower drive pulley 22 and extends below this pulley into the interior of frame 12. Frame 12 is hollow and carries vacuum impeller 24 therein.

Frame 12 has an intake opening 26 on the bottom thereof. Intake nozzle 28 is secured to the bottom of frame 12 and embraces opening 26. Intake nozzle 28 has a forwardly directed nozzle opening 30. Furthermore, nozzle baffle 32 is adjustably mounted at the forward end of nozzle 28. Nozzle baffle 32 is an angularly mounted adjustable baffle plate which can be moved to adjust the position and amount of opening of nozzle opening 30. Bracket 34 is mounted on the top of intake nozzle 28. Bracket 34 carries lock screw 36 which is engaged in slot 38 on baffle strap 40. Movement of nozzle baffle 32 to the fully upward position completely opens the nozzle opening 30 so that it is entirely forwardly directed. In the fully downward and forward position of nozzle baffle 32, its edge is adjacent with the bottom edge of nozzle opening 30 so that the effective opening is entirely downwardly directed. In the latter position the device 10 is most satisfactory for vacuuming alone, while in the intermediate position shown, the vacuum is in the most desirable position for combined mowing and vacuuming.

By the above described structure, air, cuttings, and other debris are drawn into the nozzle opening 30 and through frame 12 by rotation of impeller 24. Frame 12 has a discharge nozzle 42 to which is connected vacuum bag 44. Vacuum bag 44 is of conventional design, and is a porous structure which permits the discharge of air while retaining therein larger materials. Thus, cuttings and other major cutting debris are retained within bag 44. Bag 44 can be disconnected from nozzle 42 so that it may be dumped out. Bag 44 is preferably supported from handle bar 18, as is shown in FIG. 1.

In order to provide at least partial support for the front of the frame 12, in addition to the support provided by the wheels 14 a pair of casters are mounted under the front end of the frame. One of the casters is shown at 46, and a similar caster wheel is mounted upon the other side. Torsion bar 48 is firmly fixed to the bottom of the intake nozzle 28, at the center of bar 48 so that the ends of the torsion bar provide torsion spring mounting for the caster wheels 46. Torsion arms are mounted on the ends of torsion bar 48, and one of these arms is shown at 50. Torsion arm 50 carries caster bracket 52 on which caster wheel 46 is mounted. The torsion bar 48 provides sufficient downward thrust on caster wheel 46 so that the front end of device 10 is supported at the correct height above the ground. Preferably, adjustability of the torsion bar mounting 48 is provided so that the height is adjustable.

Figure 2:
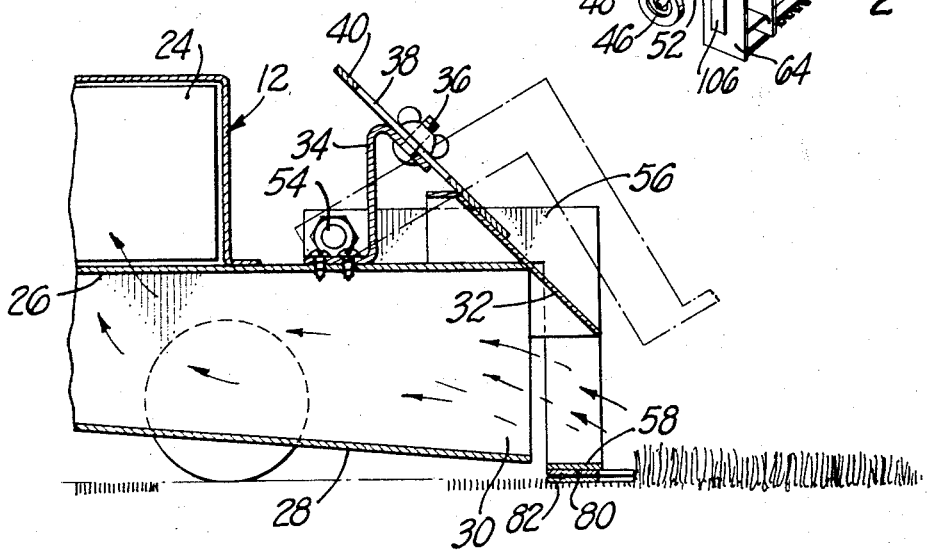
FIG. 2 is an enlarged partial section taken generally along the line 2—2 of FIG. 1.

The mower mechanism is pivoted on pivot bolts 54 which are fixed to the top of intake nozzle 28 at each side thereof. Mower arms 56 are pivoted upon these pivot bolts and extend forwardly past the front end of intake nozzle 28 and thence downwardly adjacent to bottom edge thereof. In operative position mower arms 56 lie across the top of nozzle 28 and then extend downward to terminate adjacent the ground plane determined by wheels 14 and 46. Cross bar 58 is secured to the mower arms 56 and extends transversely of the device 10 in front of nozzle opening 30, as is seen in FIG. 2.

Bearings 60 and 62 are fixed to bearing plate 64 which is carried upon mower arm 56. Mower shaft 66 is rotatably mounted in the bearings. The upper end of the mower shaft 66 carries pulley 68 which carries belt 70. Belt 70 is also in engagement with pulley 22 so that upon rotation of motor means 20, shaft 66 turns. Secured to the lower end of the shaft 66 so as to rotate therewith is eccentric assembly 72. Eccentric assembly 72 comprises upper eccentric 74, lower eccentric 76 and spacer disc 78.

Figure 4:
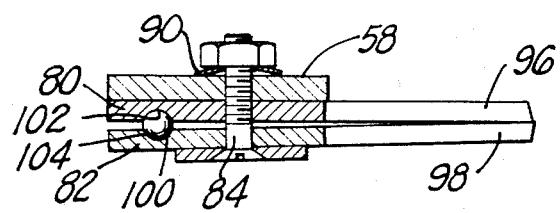
FIG. 4 is an enlarged transverse section across the cutter bars of the mower of this invention.
Figure 3:
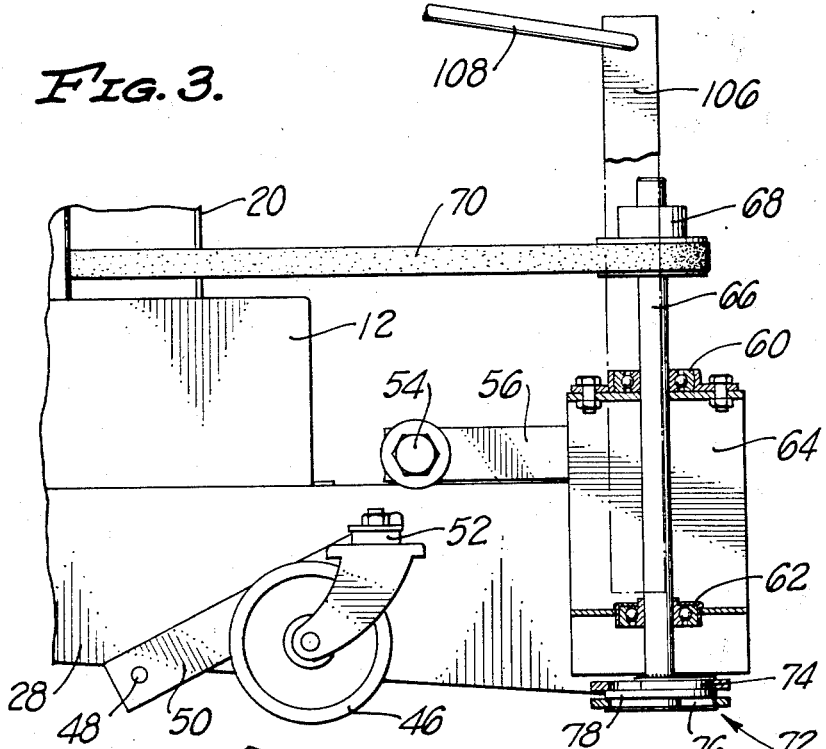
FIG. 3 is a partial side elevational view and partial sectional view showing the construction of a portion of the mower of this invention.
Figure 5:
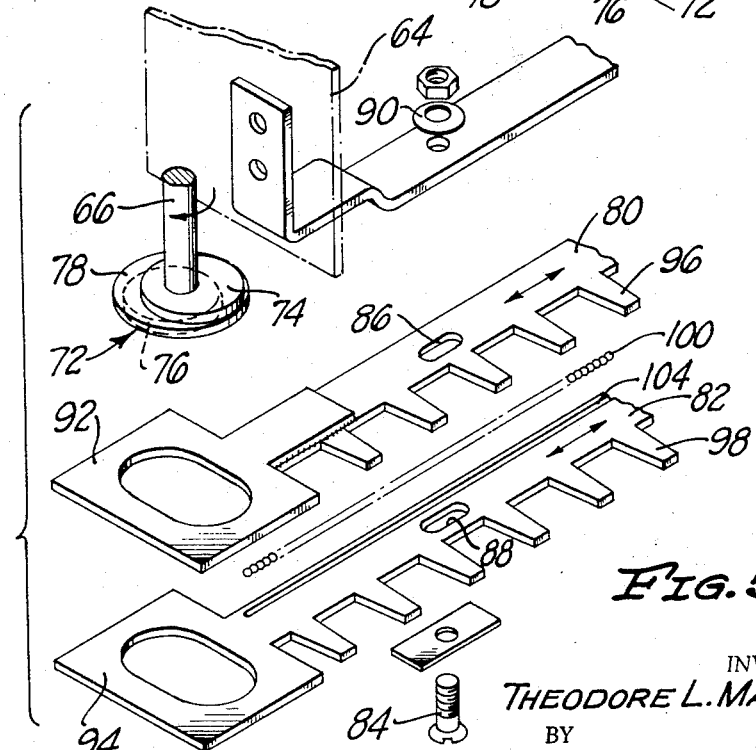
FIG. 5 is an exploded isometric view of operative parts of the mower of this invention.

Upper and lower cutter bars 80 and 82 are mounted below cross bar 58, as is shown in FIG. 4. Clamp bolts 84 extend through longitudinal slots 86 and 88 in cutter bars 80 and 82 and are secured to cross bar 58. While several of these clamp bolts are provided along the length of the cutter bars, only one is shown in detail. Spring washer 90 is positioned between cross bar 58 and upper cutter bar 80 so as to urge the cutter bars together.

The ends of the cutter bars respectively carry eccentric yokes 92 and 94 which respectively embrace and engage eccentrics 74 and 76. Thus, by rotation of shaft 78 the cutter bars reciprocate with respect to each other. Spacer disc 76 spaces eccentric yokes 92 and 94 so that they do not engage with and interfere with each other.

Blades 96 and 98 are respectively secured to the front edges of cutter bars 80 and 82 and extend forward therefrom. They cooperate with each other so that upon respective reciprocation of the cutter bars and the blades, the blades enter into cooperative shear cutting engagement with each other. Rather than being conventional, however, blades 96 and 98 are urged toward each other by means of antifriction balls 100 which are respectively in engagement with ball tracks 102 and 104 arranged longitudinally on the facing surfaces of upper and lower cutter bars 80 and 82 respectively. As can be seen especially well in FIG. 4, clamp bolt 84 is positioned between ball tracks 102 and 104 and blades 96 and 98. Thus, spring washers 90 urge blades 96 and 98 together and a pivot point is formed by the balls in the ball tracks. Furthermore, the width of the blades, along the length of the upper and lower cutter bars, is less than the width between the blades so that the blades have an opportunity to lie in the space during reciprocation and the blade edges engage against each other over the entire length of the cutting edges during reciprocation of the blades. Thus, the upper cutter bar 80 and its blades 96 rotate somewhat about the center line of the antifriction balls 100 as the cutter bar 80 reciprocates with respect to its companion cutter bar 82. This assures proper shear action between the blades 96 and 98, as compared to prior art flat, face to face shear blades. Furthermore, this rubbing action and engagement causes some wear along the shear edges to result in continuous resharpening of the shear blades.

Since the entire cutter assembly is pivoted about pivot bolts 54, it can be swung upward to the dotted line position shown in FIG. 2. In this position the device 10 can be used as a vacuum, without bringing the cutter into operative position. It may be desired in such vacuum operations that the nozzle baffle 32 may be lowered to the height of bottom of nozzle 30 so that vacuuming occurs in a straight upward direction, with a bottom opening for vacuuming. In order to control the position of the cutter assembly, lever 106 is attached to the side of bearing plate 64. Link 108 is attached to the top of lever 106 and extends to hand lever 110 which is pivoted to handle 16. Thus, by manipulation of hand lever 110 the cutter assembly can be swung toward and away from operative position. When it is swung away from operative position, belt 70 is released so that the cutter does not operate.

In operation, and particularly with respect to operation of both the cutter and the vacuum device, the cutter assembly is swung into the position shown in full lines in FIG. 2 and the nozzle baffle 32 is appropriately positioned to provide maximum upward pull on the uncut grass and inward pull on the cut grass for maximum efficiency of both holding the grass in position for cutting and removal of the cut grass into vacuum bag 44. When so positioned, motive means 20 is started and the device 10 is propelled in a forward direction to move the cutter bars through the grass to be cut. The unexpected result of the present combination is the holding of the uncut grass in such a position as to be efficiently cut by the cutter bars, rather than be pushed over by the cutter bars and left uncut. This upward force is created by the appropriate positioning of the nozzle opening with respect to the cutter bars to maintain a flow of air in such a direction as to urge the grass in the desired direction. Thus, efficient grass cutting is accomplished.

This invention having been described in its preferred embodiment it is clear that it is susceptible to numerous modifications and embodiments within the scope of the routine engineer and without the exercise of the inventive faculty. Accordingly, the scope of this invention is defined by the scope of the following claims.

I claim:

1. A combined mower and vacuum device, said device comprising motive means, a vacuum means connected to said motive means to be driven by said motive means, a nozzle having means defining an adjustable opening connected to said vacuum means, mower means connected to be driven by said motive means, said mower means being adapted to cut vegetation, said mower means being positioned adjacent said nozzle of said vacuum means so that when said mower means is moved into vegetation, the vacuum induced by said nozzle acts upon the vegetation during the action of said mower means with the vegetation so as to hold the vegetation in position to be cut and said vacuum nozzle withdraws a substantial part of the vegetation cut by said mower means away from said mower means.

2. The device of claim 1 wherein said mower means comprises a cutter bar mower having upper and lower cutter bars, said upper and lower cutter bars being reciprocated with respect to each other by means of said power means, spaced cutter blades on said upper and lower cutter bars, said spaced cutter blades cooperating with each other in shear cutting action when said cutter blades are reciprocated with respect to each other.

3. The device of claim 2 wherein separating means is positioned between said cutter bars and closing means engages said cutter bars, said closing means being positioned between said separating means in said cutter blades.

4. The device of claim 3 wherein said separating means comprises a plurality of balls.

5. The device of claim 4 wherein said closing means comprises spring means, said separating means and said spring means being arranged so that said cutter bars are angularly related to each other so that said cutter blades coact for accurate shear cutting operation.

6. The device of claim 2 wherein an eccentric shaft is mounted on said mower means, said eccentric shaft being connected to be driven by said motive means, upper and lower eccentrics on said eccentric shaft, yokes on said upper and lower cutter bars, said yokes respectively engaging said upper and lower eccentrics so that said upper and lower cutter bars each reciprocate with respect to said mower means.

7. The device of claim 6 wherein a separating disc is positioned between said upper and lower eccentrics.

8. The device of claim 2 wherein said mower means is pivotally mounted on said device so that said mower means can be pivoted away from said vacuum nozzle.

References Cited
UNITED STATES PATENTS

| | | | |
|---|---|---|---|
| 379,881 | 3/1888 | Voss | 56—304 |
| 597,400 | 1/1898 | Douglass | 56—304 |
| 1,077,182 | 10/1913 | Yank | 56—259 |
| 1,614,386 | 1/1927 | Peebles et al. | 56—23 |
| 2,026,291 | 12/1935 | Tirimacco | 56—23 |
| 2,629,218 | 2/1953 | Smith | 56—23 XR |
| 2,779,146 | 1/1957 | Mitchell et al. | 56—25.4 |
| 3,121,303 | 2/1964 | Tomlinson et al. | 56—297 |

RUSSELL R. KINSEY, *Primary Examiner.*

U.S. Cl. X.R.

56—26.5